(12) United States Patent
McGrath et al.

(10) Patent No.: US 9,245,111 B2
(45) Date of Patent: Jan. 26, 2016

(54) OWNER COMMAND EXECUTION IN A MULTI-TENANT CLOUD HOSTING ENVIRONMENT

(75) Inventors: Michael P. McGrath, Schaumburg, IL (US); Matthew Hicks, Westford, MA (US); Daniel Charles McPherson, Raleigh, NC (US); James Martin Jagielski, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 362 days.

(21) Appl. No.: 13/461,705

(22) Filed: May 1, 2012

(65) Prior Publication Data

US 2013/0297795 A1 Nov. 7, 2013

(51) Int. Cl.
| | | |
|---|---|---|
| *G06F 15/173* | (2006.01) | |
| *G06F 21/53* | (2013.01) | |
| *G06F 9/44* | (2006.01) | |
| *G06F 9/455* | (2006.01) | |

(52) U.S. Cl.
CPC .............. *G06F 21/53* (2013.01); *G06F 9/4445* (2013.01); *G06F 2009/4557* (2013.01); *G06F 2209/5011* (2013.01)

(58) Field of Classification Search
None
See application file for complete search history.

(56) References Cited

U.S. PATENT DOCUMENTS

| | | | |
|---|---|---|---|
| 6,009,452 A | 12/1999 | Horvitz | |
| 7,774,761 B2 | 8/2010 | Vohra | |
| 7,853,708 B2 | 12/2010 | Townsley et al. | |
| 8,352,941 B1 | 1/2013 | Protopopov et al. | |
| 8,356,274 B2 | 1/2013 | Kwok et al. | |
| 8,505,006 B1 | 8/2013 | Larkin et al. | |
| 8,635,351 B2 | 1/2014 | Astete et al. | |
| 2002/0091753 A1 | 7/2002 | Reddy et al. | |
| 2007/0128899 A1 | 6/2007 | Mayer | |
| 2008/0163004 A1 | 7/2008 | Yu | |
| 2008/0320474 A1 | 12/2008 | Jelinek et al. | |
| 2009/0313374 A1 | 12/2009 | Murphy et al. | |
| 2009/0313620 A1 | 12/2009 | Sedukhin et al. | |
| 2010/0122343 A1 | 5/2010 | Ghosh et al. | |
| 2010/0153951 A1 | 6/2010 | Jones | |
| 2010/0275241 A1 | 10/2010 | Srinivasan | |
| 2011/0055310 A1 | 3/2011 | Shavlik et al. | |
| 2011/0246617 A1 | 10/2011 | Sheehan et al. | |

(Continued)

OTHER PUBLICATIONS

USPTO, Office Action for U.S. Appl. No. 13/461,712 mailed Feb. 27, 2014.

(Continued)

*Primary Examiner* — Mohamed Wasel
*Assistant Examiner* — Tsung Wu
(74) *Attorney, Agent, or Firm* — Lowenstein Sandler LLP (57) ABSTRACT

A owner command to an application hosted by a platform as a service (PaaS) system can be performed, in one embodiment, by receiving the command from the authenticated owner at a first resource pool containing a first application component of the application, wherein the first node hosts a plurality of resource pools each containing application components belonging to different application owners. A second resource pool associated with the application is then identified, the second resource pool being hosted on a second node and containing a second application component of the application. The, a command implementation sequence defining the implementation of the received command over multiple application components is executed by performing a first action on the first application component on the first node and performing a second action on the second application component on the second node.

20 Claims, 6 Drawing Sheets

(56) References Cited

U.S. PATENT DOCUMENTS

| | | | |
|---|---|---|---|
| 2011/0252320 A1 | 10/2011 | Arrasvuouri et al. | |
| 2011/0276584 A1 | 11/2011 | Cotner et al. | |
| 2011/0277027 A1 | 11/2011 | Hayton et al. | |
| 2011/0302415 A1 | 12/2011 | Ahmad et al. | |
| 2012/0011077 A1 | 1/2012 | Bhagat | |
| 2012/0096165 A1* | 4/2012 | Madduri et al. | 709/226 |
| 2012/0173581 A1 | 7/2012 | Hartig et al. | |
| 2012/0185913 A1 | 7/2012 | Martinez et al. | |
| 2012/0215919 A1* | 8/2012 | Labat | G06F 9/5011 709/226 |
| 2013/0007239 A1 | 1/2013 | Agarwal et al. | |
| 2013/0055243 A1 | 2/2013 | Dandekar et al. | |
| 2013/0227561 A1 | 8/2013 | Walsh et al. | |
| 2013/0227563 A1 | 8/2013 | McGrath et al. | |
| 2013/0227635 A1 | 8/2013 | Walsh et al. | |
| 2013/0297672 A1 | 11/2013 | McGrath et al. | |
| 2013/0297673 A1 | 11/2013 | McGrath et al. | |
| 2013/0297685 A1 | 11/2013 | McGrath et al. | |
| 2013/0298183 A1 | 11/2013 | McGrath et al. | |
| 2014/0040883 A1 | 2/2014 | Tompkins | |

OTHER PUBLICATIONS

USPTO, Office Action for U.S. Appl. No. 13/408,754 mailed Jan. 16, 2014.
USPTO, Notice of Allowance for U.S. Appl. No. 13/461,584 mailed Jan. 29, 2014.
USPTO, Office Action for U.S. Appl. No. 13/408,729 mailed Mar. 12, 2014.
USPTO, Office Action for U.S. Appl. No. 13/408,676 mailed Feb. 27, 2014.
USPTO, Office Action for U.S. Appl. No. 13/461,722 mailed Sep. 20, 2013.
The Authoritative Dictionary of IEEE Standards Terms. 2000, Standards Information Network IEEE Press. seventh edition. p. 131 and 530.
Corcoran et al. Cross-Tier, Label-based Secuirty Enforcement for Web Applications. 2009. ACM. pp. 269-281.
Linux man page pam_namespace; htt://web.archive.org/web/20081014010639/http://linux.die.net/man/8/pam_nampespace; Oct. 14, 2008.
Loscocco et al. Meeting Critical Security Objectives with Security-Enhanced Linux. 2001. NSA. pp. 1-11.
Morris, James. File System Labeling in SELinux. 2004. RedHat. pp. 1-8.
Red Hat Inc., Red Hat Enterpise Linux 5 Deployment guide, "Deployment, configuration and administration of Red Hat Enterprise Linux 5", Chapter 46—Security and SELinux, pp. 823-848, 26 pages, Jul. 21, 2011.
Smalley, Stephen D. SELinux. 2001.NSA. pp. 1-23.
Unix man unshare clone Janak Desai, Jan. 11, 2006; p. 1-5.
Wiki LXC; http://web.archive.org/web/20120130164103/http://en.wikipedia.org/wiki/LXC; Jan. 30, 2012.
USPTO, Office Action for U.S. Appl. No. 13/408,001 mailed Jul. 16, 2014.
USPTO, Final Office Action for U.S. Appl. No. 13/408,754 mailed Jun. 4, 2014.
USPTO, Advisory Action for U.S. Appl. No. 13/408,754 mailed Aug. 11, 2014.
USPTO, Notice of Allowance for U.S. Appl. No. 13/461,584 mailed May 22, 2014.
USPTO, Notice of Allowance for U.S. Appl. No. 13/408,729 mailed Sep. 29, 2014.
USPTO, Notice of Allowance for U.S. Appl. No. 13/408,729 mailed Jan. 22, 2015.
USPTO, Office Action for U.S. Appl. No. 13/461,715 mailed Jul. 23, 2014.
USPTO, Notice of Allowance for U.S. Appl. No. 13/408,676 mailed Oct. 7, 2014.
USPTO, Notice of Allowance for U.S. Appl. No. 13/408,676 mailed Jan. 23, 2015.
Maoke Chen and Akihiro Nakao, "Feather-Weight Network Namespace Isolation Based on User-Specific Addressing and Routing in Commodity OS," T. Magedanz et al. (EDS.): TridentCom 2010, LNICST 46, pp. 53-68, 2011.
An Quin et al., "Xconveryer: Guarantee Hadoop Throughput via Lightweight OS-level Virtualization," 2009 Eighth International Conference on Grid and Cooperative Computing, IEEE 2009, pp. 299-304.
Anup K. Ghosh and Angelos Stavrou, "DARPA Mobivisor: An Architecture For High Assurance For Untrusted Applications On Wireless Handheld Devices Via Lightweight Virtualization," Nov. 2010, 28 pages.
Authors et al., "Apparatus and Method of Tenant Context Generation and Propagation in SaaS Environment," Aug. 19, 2010, IP.com. pp. 1-4.

* cited by examiner

OWNER COMMAND EXECUTION IN A MULTI-TENANT CLOUD HOSTING ENVIRONMENT

TECHNICAL FIELD

The embodiments of the invention relate generally to cloud-based application hosting and, more specifically, relate to a Platform-as-a-Service Offering.

BACKGROUND

Cloud computing is a computing paradigm in which a customer pays a "cloud provider" to execute a program on computer hardware owned and/or controlled by the cloud provider. It is common for cloud providers to make virtual machines hosted on its computer hardware available to customers for this purpose. The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For programs that are web applications, the additional software can include such software components as middleware and a framework. Web applications are programs that receive and act on requests in web or other Internet protocols, such as HTTP. It is common for a user to interact with a web application via a browser executing on the user's client computer system to send requests in a web protocol via the Internet to a server computer system on which the web application is executing. It is also common for automatic user agents to interact with web applications in web protocols in the same fashion.

While many web applications are suitable for execution in the cloud, it often requires significant expertise and effort in order to install, execute, and manage a web application in the cloud. For example, an administrator typically should identify all of the software components for the execution of a web application, and what versions of those software components are acceptable. In addition, the administrator typically should obtain, install, and appropriately configure each such software component, as well as the application itself. Where this high level of expertise and effort has been invested in order to get a web application running on a particular hypervisor and in a particular provider's cloud, a similarly high level of expertise and effort usually should be subsequently invested in order to execute the web application instead or in addition on a different hypervisor and/or in a different particular provider's cloud. Also, it can be difficult or impossible to obtain useful information about how the application is performing and otherwise behaving when executing in the cloud.

Accordingly, software and/or hardware facilities for facilitating the execution of web applications in the cloud have been introduced, and are known as Platform-as-a-Service (PaaS) offerings and systems. PaaS offerings facilitate deployment of applications without the cost and complexity of buying and managing the underlying hardware and software and provisioning hosting capabilities, providing facilities for supporting the complete life cycle of building and delivering web application and services entirely available from the Internet. Typically, these facilities operate as one or more virtual machines (VMs) running on top of a hypervisor in a host server.

In present PaaS offerings, a first customer's deployed applications do not co-exist with any other customer's deployed applications on the VMs that are hosting the first customer's deployed applications. However, such an arrangement can be inefficient to the PaaS provider offering the platform services. This is because a customer often deploys a single application, and the size of the VM does not correspond to the size of the application. It can be costly to initialize a new VM for each customer's application deployment, and it can also be a waste of resources that are not being utilized. In a public cloud environment, a PaaS provider pays for deploying a VM whether the VM lies idle or not. In a private cloud environment, there is still a strain on resources for running VMs that are not completely utilized. As such, it may be more cost-efficient to deploy applications of multiple customers in a single VM, rather than associating a VM or a group of VMs with a single application or a group of applications from a single customer. However, a variety of implementation concerns arise when considering deploying applications of multiple customers in a single VM, such as security concerns and efficient resource sharing concerns.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide for command execution in a multi-tenant cloud hosting environment. A method of the invention includes receiving a command from an authenticated owner of an application at a first resource pool containing a first application component of the application, wherein the first node hosts a plurality of resource pools each containing application components belonging to different application owners. A second resource pool associated with the application is then identified, the second resource pool being hosted on a second node and containing a second application component of the application. The, a command implementation sequence defining the implementation of the received command over multiple application components is executed by performing a first action on the first application component on the first node and performing a second action on the second application component on the second node.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "executing," "applying," "discovering," "identifying," "configuring," "establishing," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Figure 1:
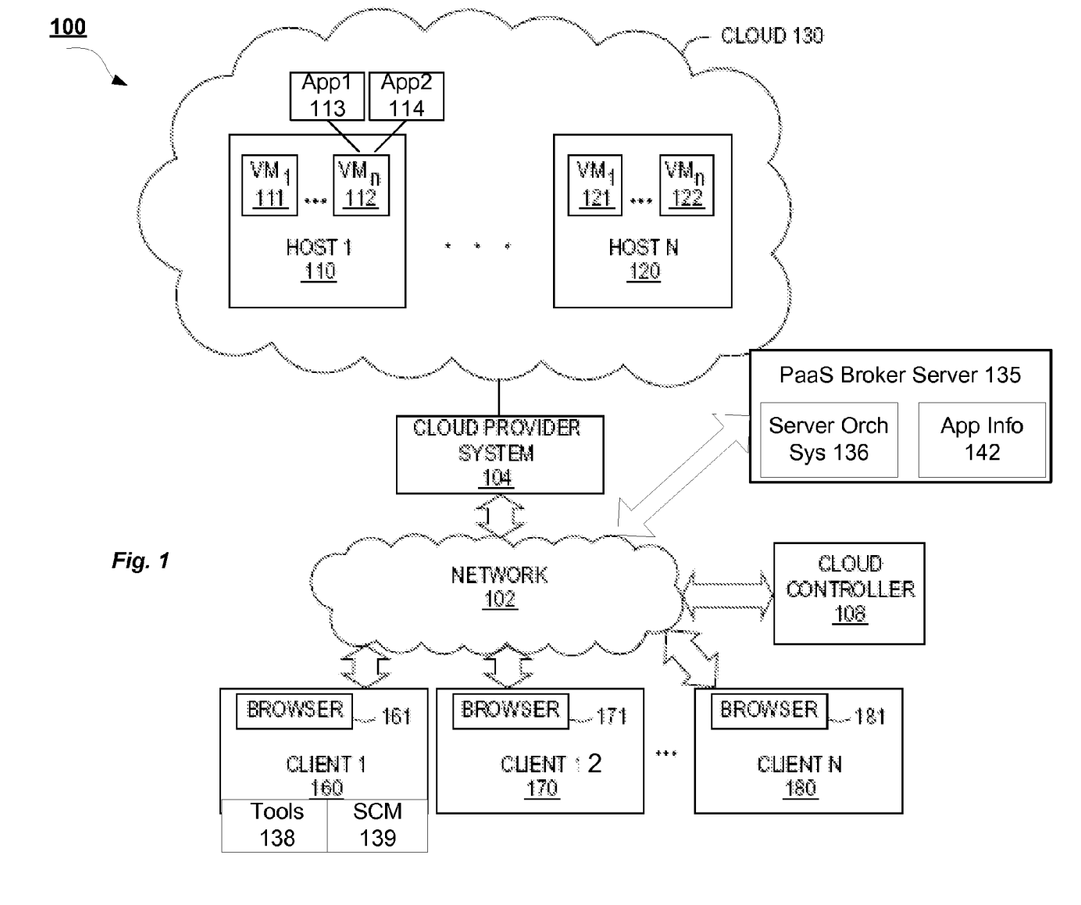
FIG. 1 is a block diagram of a network architecture in which embodiments of the invention may operate.

FIG. 1 is a block diagram of a network architecture 100 in which embodiments of the invention may operate. The network architecture 100 includes a cloud 130 managed by a cloud provider system 104. The cloud 130 provides virtual machines, such as virtual machines 111, 112, 121, and 122. Each virtual machine is hosted on a physical machine configured as part of the cloud 130. Such physical machines are often located in a data center. For example, virtual machines 111 and 112 are hosted on physical machine 110 in cloud 130 provided by cloud provider 104. Users can interact with applications executing on cloud-based virtual machines using client computer systems, such as clients 160, 170 and 180, via corresponding web browser programs 161, 171 and 181.

Clients 160, 170 and 190 are connected to hosts 110, 120 and the cloud provider system 104 via a network 102, which may be may be a private network (e.g., a local area network (LAN), a wide area network (WAN), intranet, or other similar private networks) or a public network (e.g., the Internet). Each client 160, 170, 190 may be a mobile device, a PDA, a laptop, a desktop computer, or any other computing device. Each host 110, 120 may be a server computer system, a desktop computer or any other computing device. The cloud provider system 104 may include one or more machines such as server computers, desktop computers, etc.

In one embodiment, the cloud provider system 104 is coupled to a cloud controller 108 via the network 102. The cloud controller 108 may reside on one or more machines (e.g., server computers, desktop computers, etc.) and may manage the execution of the Web applications in the cloud 130. In one embodiment, the cloud controller 108 receives commands from PaaS broker server 135. Based on these commands, the cloud controller 108 provides data associated with different applications to the cloud provider system 104. PaaS broker server 135 is physical server or a virtual machine and can be hosted by a the same IaaS infrastructure as the hosts 110-120, such as Amazon Cloud Services.

Some of the clients 160-180 access the Web applications hosted on the VMs 111-122 as users. For example, a Web application can be an online social network or blog, and a client can log into the social network or blog to update content and generally use the functionality of the Web application. In one embodiment, each VM 111-122 is a multi-tenant node, meaning each VM can host multiple Web applications owned or managed by different clients. For example, VM 112 is shown hosting two applications of different users or customers, namely, App1 113 and App2 114. A client machine, such as client 1 160 can also be used to create and manage Web applications, such as for example App1 113 hosted by VM 112. As is explained in more detail below, in one embodiment, client 1 160 may be a machine used by a customer of a PaaS system to create or upload a Web application to be hosted by the PaaS system.

The client 160 can include tools 138. Alternatively, tools 138 can be provided by the PaaS broker server 135, and a user of the client 150 can access tools 138 via the browser 161, a command line, or other interface. The tools 138 can be used to issue commands that result in the PaaS broker server 135 creating and managing a Web application on one of the VMs, such as VM1 112, shown as hosting two applications (App1, App2). In one embodiment, the client 160 can also include a source code management (SCM) 139 system, such as Git, to manage version control and to send code to a remote repository on the host nodes 110-120.

In one embodiment, to identify VM1 as the node to create the Web application on, the PaaS broker server 135 can communicate with and collect information from the VMs using a server orchestration system 136. In one embodiment, the PaaS broker server 135 maintains application information 142 about each Web application being hosted on the VMs to track which VM each application is hosted on. Since each VM hosts multiple applications belonging to different application owners in a multi-tenant node environment, applications have specific identifiers as the identifier of the node can correspond to multiple applications. Unique identification of applications, along with sandboxing techniques including security, segregation, and isolation can be used to keep each application from accessing or interfering with another application that may be managed by a different owner. For example, on Linux-based nodes, SELinux™ security labeling can be used to secure access to the applications and Linux control groups can be used to segregate application into different processing spaces, and kernel namespacing can be further used to segregate applications. Tools such as Diskquota™ can then be used to allocate separate resources to the isolated applications. Nodes running other operating system environments can use other such sandboxing techniques to segregate and isolate applications from one another and from the node operating system.

While various embodiments are described in terms of the environment described above, those skilled in the art will appreciate that the facility may be implemented in a variety of other environments including a single, monolithic computer system, as well as various other combinations of computer systems or similar devices connected in various ways.

Figure 2A:
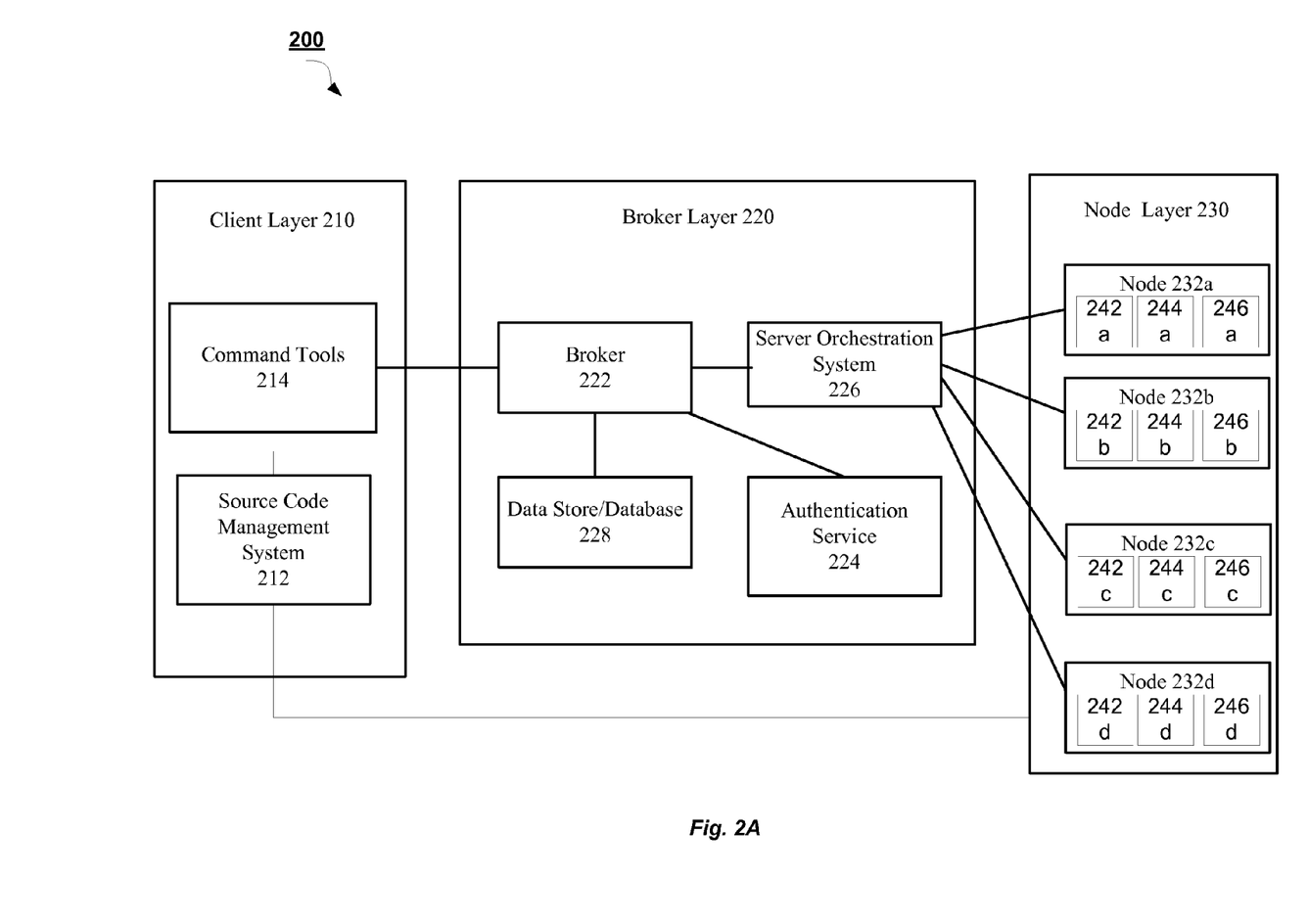
FIG. 2A is a block diagram of a PaaS system architecture according to an embodiment of the invention.

FIG. 2A is a block diagram of a PaaS system architecture 200. The PaaS architecture 200 allows users to launch software applications in a cloud computing environment, such as the could computing environment provided in network architecture 100 described with respect to FIG. 1. The PaaS architecture 200, in one embodiment, includes a client layer 210. In one embodiment, the client layer 210 resides on a client machine, such as a workstation of the software developer. In another embodiment, the client layer 210 resides on a server and is accessible to the client machine via the browser. The client layer 210 includes a source code management system 212, sometimes referred to as "SCM" or revision control system.

One example of such an SCM or revision control system is Git, available as open source software. Git, and other such distributed SCM systems, usually include a working directory for making changes, and a local software repository for storing the changes. The packaged software application can then be "pushed" from the local Git repository to a remote Git repository. From the remote repository, the code may be edited by others with access, or the application may be executed by a machine. Other SCM systems work in a similar manner.

The client layer 210, in one embodiment, also includes a set of command tools 214 that a user can use to create, launch, and manage applications. In one embodiment, the command tools 214 can be downloaded and installed on the user's client machine, and can be accessed via a command line interface or a graphical user interface, or some other type of interface. In one embodiment, the command tools 214 expose the application programming interface ("API") of the broker layer 220 and perform other application management tasks in automated fashion using other interfaces, as will be described further below in accordance with some embodiments.

In one embodiment, the broker layer 220 acts as middleware between the client layer 210 and the node layer 230. The node layer 230 includes the nodes 232 on which software applications are provisioned and executed. In a multi-tenancy cloud hosting environment, each of at least some of the nodes 232 hosts multiple applications 242-246 or application components of different application owners (e.g., different customers of the PaaS system). For example, on node 232a, application 242a and 246a may have different owners.

As used herein, an "application owner," or simply "owner," is the person, persons, or entity that creates, operates, and/or manages an application. The application owner uses the client layer 210 to interact with each application owned by the owner on the node layer 230. The owner is thus the customer of the PaaS system 200. In contrast, a user of the application refers to the end user of the application, i.e., the customer of the application. As an example, a social network company can be the application owner, and a social network member using the social network application can be the user of the social network application.

Using multi-tenancy to host multiple applications belonging to multiple application owners saves resources, as multiple applications can utilize the operating system, middleware, communications resources, and other shared resources of the node 230. However, hosting multiple applications belonging to different application owners and operators on a single node results in various complications that are addressed by the embodiments set forth herein.

In one embodiment, each node 232 is a virtual machine (VM) provisioned by an Infrastructure as a Service (IaaS) provider, such as Amazon Web Services™. In other embodiments, the nodes 232 can be physical machines or virtual machines residing on a single physical machine. In one embodiment, the broker layer 220 is implemented on one or more machines, such as server computer, desktop computer, etc. In some embodiments, the broker layer 220 may be implemented on one or more machines separate from machines implementing each of the client layer 210 and the node layer 230.

In one embodiment, the broker layer 220 includes a broker that coordinates some of the requests from the client layer 210 with actions performed at the node layer 230. One such request is new application creation. In one embodiment, when a user, using the command tools 214 requests the creation of a new application, or some other action to manage the application, the broker 222 first authenticates the user using an authentication service 224 such as Streamline™ or some other authentication tool. Once the user has been authenticated and allowed access to the system, the broker 222 uses a server orchestration system 226 to collect information and configuration information about the nodes 232.

In one embodiment, the broker 222 uses the Marionette Collective™ ("MCollective™") framework available from Puppet Labs™ to facilitate parallel job execution of the server orchestration system 226. The server orchestration system, in one embodiment, functions to coordinate server-client interaction between multiple—sometimes a large number of—servers. The servers being orchestrated in one embodiment are the nodes 232, which are acting as application servers and web servers.

For example, if the broker 222 wanted to shut down all applications on all even numbered nodes out of 100,000 nodes, the broker 222 would only need to provide one command to the server orchestration system 226. The server orchestration system 226 would—in one embodiment—generate a separate message to all nodes to shut down applications if the node is even, and distribute the messages to the nodes using a messaging and queuing system. Thus, in one embodiment, the broker 222 manages the business logic and model representing the nodes 232 and the applications residing on the nodes, and acts as the controller that generates the actions requested by users via the client tools 214 API. The server orchestration system 226 then takes those actions generated by the broker 222 and orchestrates their execution on the many nodes 232 managed by the system.

In one embodiment, the information collected about the nodes 232 can be stored in a data store 228. In one embodiment, the data store 228 can be a locally hosted database or file store, or it can be a cloud based storage service provided by a SaaS storage provider, such as Amazon™ S3™ (Simple Storage Service™). The broker 22 then uses the information about the nodes 232 and their applications to model the application hosting service and to maintain records about the nodes. In one embodiment, node data is stored in the form of a JavaScript Object Notation (JSON) blob or string that maintains key-value pairs to associate a unique identifier, a hostname, a list of applications, and other such attributes with the node.

Figure 2B:
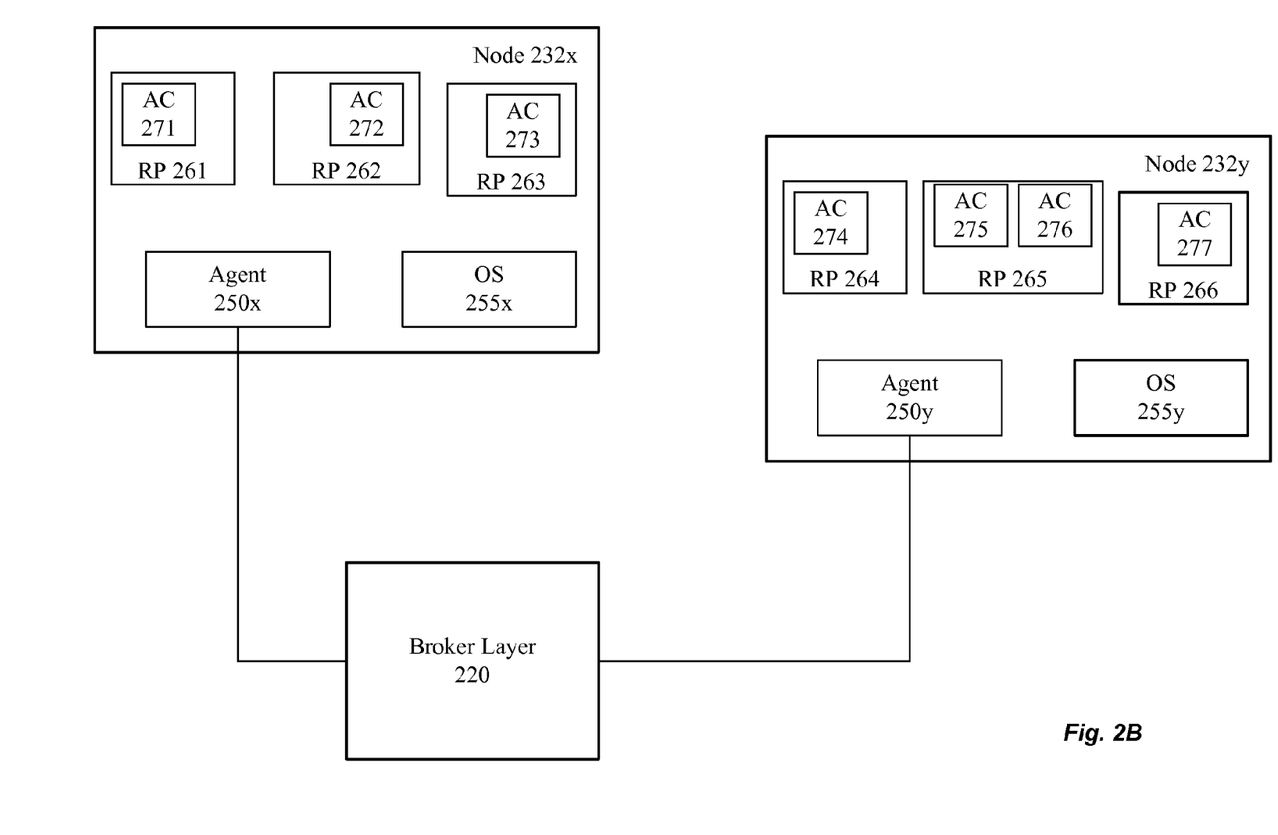
FIG. 2B is a block diagram of a communication infrastructure between a broker layer and a node layer according to an embodiment of the invention.

Another embodiment of node architecture for nodes 232 is now described with reference to FIG. 2B. In one embodiment, nodes 232—which may be virtual machines of a cloud-based IaaS environment—can be further subdivided into resource pools. For example, node 232x is shown to have three resource pools 261-263. Other embodiments can have any other number of resource pools per node, and the number of resource pools can vary between different nodes and implementations.

Each node 232 is allocated a certain amount of hardware and middleware resources, such as memory, processing cycles, communications, messaging, and other such provisions to implement a virtual machine. Each node 232 also has a node operating system 255 to manage and use those allocated resources. In one embodiment, a resource pool is a further division of those allocated resources into distinct and separate groups. As used herein, a resource pool refers to a collection of VM/node resources—such as processing cycles, memory, and middleware—that are districted away from other VM resources. In some embodiments, a resource pool includes a software cartridge that acts as middleware for an application component (for example, JBoss for an application server component of a composite application). The resource pools can be managed by the node operating system 255.

In one embodiment, the resource pools are segregated from each other, so that each resource pool accesses common node resources as if it were the only resource pool on the node. This allows multiple resource pools to share some node resources (such as an HTTP server and the underlying node operating system). In one embodiment using a Linux-based node, resource pools are segregated from each other using SELinux™ security labeling, Linux control groups, and kernel namespacing, as described above. Nodes running other operating system environments can use other such sandboxing techniques to segregate and isolate resource pools from one another and from the node operating system. Communications between the broker 222 and the nodes 232 can be coordinated by an agent 250 of a server orchestration system or other messaging platform, as described further below.

In one embodiment, applications are not only associated with a node 232 and a software repository on the node, but with a resource pool. In one embodiment, one resource pool contains only one application, or multiple applications owned by the same client. In such an embodiment, the resource pools are used as the security and segregation container to implement multi-tenancy.

In yet other embodiments, the applications hosted by the PaaS system include composite n-tier Web applications that have several separate components, such as a Web server, an application server, and a database, all implemented separately. In such an embodiment, each application component can be provided a different resource pool, although several application components owned by the same application owner can reside in the same resource pool.

For example, node 232y is shown as having three resource pools 264-266. Each resource pool is hosting an application component 274-277. Resource pools 264 and 266 host one application component each, applications components 274 and 277 respectively. Resource pool 265 is hosting two separate application components 265, 276. In one embodiment, the two separate application components 265, 276 being hosted by resource pool 265 are components of the same composite application, but in other embodiments, they may be components of different applications owned by the same application owner (PaaS customer), or two different applications owned by the same application owner.

In one embodiment, different components of one composite application can be hosted by different resource pools. For example, application component 271 and application component 272—hosted by resource pool 261 and resource pool 262 respectively—can be two components of the same composite application. In one embodiment, different components of one composite application can further be hosted by different resource pools residing on different nodes 232. For example, application component 271 and application component 277—hosted by resource pool 261 of node 232x and resource pool 266 of node 232y respectively—can be two components of the same composite application.

While much of the discussion herein is set forth in terms of applications—as a whole—for simplicity, many facets, techniques, implementations, and embodiments can be applied to application components without loss of generality. For example, when determining which node of the PaaS system to select to host an application as described further below, the same or similar methodologies and systems can be used to determine which node of the PaaS system to select to host an application component. By way of another example, communications and interfaces between the client layer and applications described further below, are equally applicable to application components instead of applications. Thus, as used herein throughout, the terms "application" and "application component" can be used interchangeably where appropriate.

Once an application has been created on a node it can be managed and controlled using the client layer 210 described with reference to FIG. 2A. The client layer 210 provides command tools 214 to enable the creator or owner of an application to interact with and manage the applications. For example, the command tools 214 can allow the application owner to stop and start applications, to download and inspect applications logs, to archive the application, to reconfigure the application, to provision additional resources to the application, to receive application performance metrics, and other such application management tasks.

In one embodiment, the broker 222 (and/or the broker layer) can simplify the task of application management to application owners, especially in the case of composite applications, or distributed applications having scaled components or different components hosted on resource pools on different nodes. Another embodiment of the broker 222 interacting with nodes 232 is now described with reference to FIG. 3. Each node 232 contains several resource pools, each containing a repository—along with middleware and other resources—that contains an application or application component.

Figure 3:
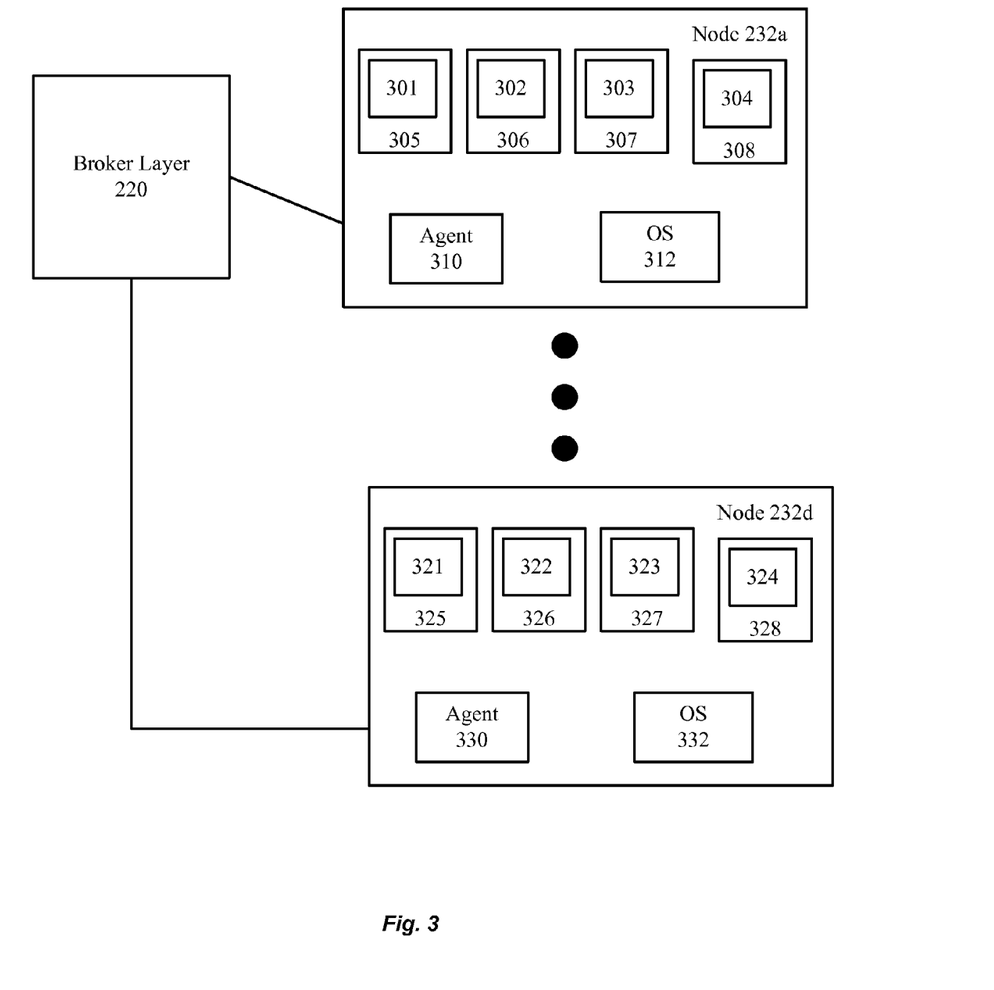
FIG. 3 is a another block diagram of a communication infrastructure between a broker layer and a node layer according to an embodiment of the invention.

For a composite application, the components of the application can be spread out over multiple resource pools. In such an embodiment, one of the resource pools acts as the interface front end of a distributed repository. Thus, one resource pool will contain the main repository that is aware of the current location of all the distributed repositories in other resource pools. When such components or resource pools are relocated, the main repository can be updated by its node using information provided by the broker or its server orchestration system 226 that it collects from these other nodes. This repository and resource pool with which the client layer interfaces will sometimes be referred to herein as the "main" resource pool or "main" repository.

For example, node 232a includes resource pools 305-308 containing repositories 301-304, each of which host an application component of different applications owned by different owners. Similarly, node 232d includes resource pools 325-328 containing repositories 321-324. As an example, repository 323 in resource pool 327 on node 232d can host a database backend for a Web frontend component hosted in repository 303 in resource pool 307 on node 232a. Furthermore, as the database grows it may be scaled or it may be replicated for failover or availability to yet more resource pools residing on additional nodes.

As explained above, a resource pool can include one or more software cartridges that act as middleware and encapsulate an application component. For example, resource pool 325 can include a JBoss cartridge implementing an application server component of the application for which resource pool 307 is hosting the web frontend server.

In one embodiment, to simplify owner interaction with such a distributed or composite web application, the owner at the client layer is only provided a single hostname to interface with the application. For example, the resource pool 307 containing the web frontend component can be designated as the main hostname. Then, when managing the application, the application owner can send instructions to a single application hostname, without requiring the client to be aware of the complexity of the application hosting.

For example, if the owner of the application issues a command via either the broker API or an SSH interface to stop the application, the broker and the nodes can orchestrate the execution of the stop command without requiring the owner to find and individually stop all components belonging to the application. Similar commands, such as start, snapshot, git push or commit, and other commands can be orchestrated seamlessly and transparently to the user.

As an example, in one embodiment, issuing the "stop" command using just the application name results in the broker 222 mapping the application name to the main resource pool 307 of the web frontend. The owner is authenticated with the broker using SSH keys to ensure that only the owner of the application is allowed to manage the application. In another embodiment, the client is already aware of the main resource pool 307. In such a case, the DNS managed by the broker 222 can map the hostname of resource pool 307 to the hostname of node 232a. In yet other embodiments, where the client is already aware of the hostname of both the main resource pool 307 and the node 232a hosting the resource pool 307, the owner can log directly into the node 232a using SSL, where the owner will be forced into resource pool 307 by the security measures and sandboxing techniques used to implement multi-tenancy, as discussed above.

In one embodiment, the stop command (or any other command) is received at the main resource pool that interfaces with the owner, in this example, resource pool 307. The frontend resource pool 307 contains a web server cartridge loaded into the resource pool 307, and web frontend code in the repository 303. The resource pool 307 contains intelligence on how to shut down or stop the application. In one embodiment, the resource pool 307 may already be aware of the other resource pools hosting components of the composite application. In other embodiments, the resource pool 307 would request this information from the broker layer 220.

The main resource pool 307 can use a broker API or the agent 310 to request that the broker layer 220 identify the locations of the other resource pools, such as the web server in resource pool 325 and the database backend in resource pool 327 in this example. The broker layer 220 can use the server orchestration system to query the nodes for applications matching the application name or identifier of the application component of the main resource pool. 307.

Once the main interface resource pool 307 is aware of all the other resource pools hosting components of the application, it can use authenticated inter-node communication to carry out the application shutdown sequence to implement the stop command. Alternatively, the main resource pool 307 can request that the broker layer 220 coordinate the shutdown of the other application components using the server orchestration system and the agent 330 of the node hosting one or more of the other resource pools.

In one embodiment, the broker layer 220 (or the main interface resource pool) is not only aware of which nodes and which resource pools are hosting the components of a particular application, but also what software cartridge or cartridges are loaded into those resource pools. In other embodiments the broker can also (or instead of) be aware of the function of the component in the application (e.g., web server, database server, load balancer), or some particular software of middleware present in the resource pool.

Such awareness can be used to perform certain commands. For example, if a web server should always be shut down before a database (to prevent lost data), then the stop command is orchestrated by the broker layer 220 and the main resource pool to shut the web server down first. Similar rules can exist for various other commands, such as start, snapshot, etc. Furthermore, some specific software or middleware (such as JBoss or MySQL) can have specific actions that are to be carried out for performing a command, such as a stop command. For example, stopping, or backing up a MySQL database can require different interactions from stopping or backing up a Mogno database.

Figure 4:
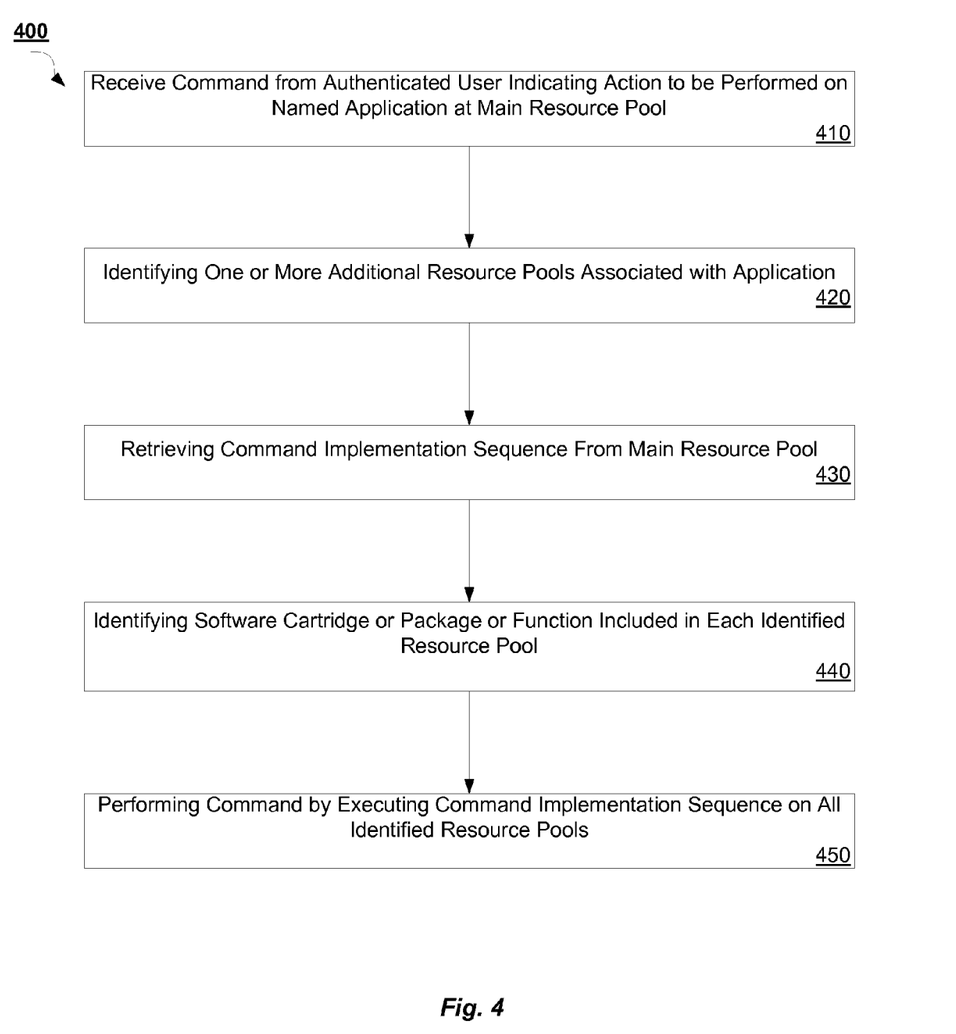
FIG. 4 is a flow diagram illustrating a method for executing a command on an application according to an embodiment of the invention.

One embodiment of an application owner interacting with their application using the PaaS system is now described with reference to FIG. 4. The method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by the command tools 214 in conjunction with the node layer 230 and the broker layer 220 of FIG. 2.

Method 400 begins at block 410 where a command is received from an authenticated application owner. The command is originating from the client layer (such as the command tools) and targeted to an application owned by the application owner. In one embodiment, the command is received at the broker layer. In another embodiment, the command is received at the main resource pool on a node that is designated as the interface resource pool for an application. The command may be a command to stop the application, to start the application, to update the code of the application via a push or commit to the one or more software repositories that host the code of the application, to back up the application, its state, and its associated runtime data, databases, etc.

At block 420, one or more additional resource pools associated with the application are identified. In one embodiment, where the command was received directly by the broker, the broker can use a DNS service or a database to map the application name or identifier to all of the resource pools where the components of the applications are hosted on the various nodes of the node layer. Alternately, the broker can query the node layer using the server orchestration system to identify which nodes and which resource pools on those nodes are associated with the application. The broker can perform similar functionality if the command is initially received by the main resource pool hosting the application component with which the owner interfaces, in this case performing the identification of the other nodes and resource pools in response to a request from the main resource pool. In yet other embodiments, the main resource pool itself maintains records on the additional resource pools associated with the application, and updates these records subscribing to updates from associated resource pools when they change location.

At block 430, a command implementation sequence is retrieved from the main resource pool. The command implementation sequence defines the backend processing to perform the requested command. For example, to stop an application, various events may need to happen in sequence. For example, first a web server may need to be shut down and pending requests processed. Next an application server may need its state backed up so that it can be restarted in the same place; then the application server can be shut down. Finally, a database may need to be backed up to disk, and then shut down. Similar sequences can be used for other types of commands, such as start, snapshot, etc.

In one embodiment, to carry out each operation in the command implementation sequence, it can be helpful to know what type of software is hosted by each identified resource pool. Thus, at block 440 some information about the software included on each resource pool is identified. In one embodiment, such information can be the function of the application component hosted in the particular resource pool (such as "web server," or "database.") In another embodiment, the type of software cartridge or package loaded onto the resource pool is identified, such as JBoss server and middleware, or MySQL database.

At block 450, the command is performed by executing the command implementation sequence. In one embodiment, the information collected about the resource pools associated with the application is used to execute the command implementation sequence, and the specific actions for each portion of the command implementation sequence. For example, the third action in the sequence may be to shut down the application server. To execute this action, the resource pool containing one of the application servers is identified. The information can further show that a JBoss middleware cartridge is loaded into this resource pool. The action can then be broken down into sub-actions that are specific to shutting down a JBoss application server that may be different from shutting down an Apache application server, for example.

As described above, the node hosting the resource pool containing the affected component implements multi-tenancy security and segregation techniques described above. Thus, as the command is performed over multiple nodes, at each node, the command only is allowed to be effective within the resource pool containing an application component belonging to the owner of the application.

In one embodiment and for certain commands, the main resource pool can orchestrate the execution of the of the command implementation sequence. In other embodiments, the main resource pool can provide that command implementation sequence to the broker and the broker can collect the needed information about the other resource pools and orchestrate the performance of the command implementation sequence using the server orchestration system.

Some commands also interact with the SCM system. For example, a command to edit the application would use the SCM to push the latest commit to the main remote repository on main resource pool using an SSL connection. The main repository then may deliver the push or commit command to the appropriate resource pool by interacting with the broker to identify the node containing the resource pool that is the intended target of the push command. Thus, an owner can push code from the client layer to the main resource pool to the database server without being aware of the location of the database server in the node layer. The main resource pool can either be aware of the location of the database repository, or can interact with the broker to query the node layer for the location of the resource pool containing such repository. In this manner, complex commands can be executed by owners of composite and distributed applications using a simple transparent interface and without requiring much information about the application on the client layer, except for client hostname, name, and/or UUID.

Figure 5:
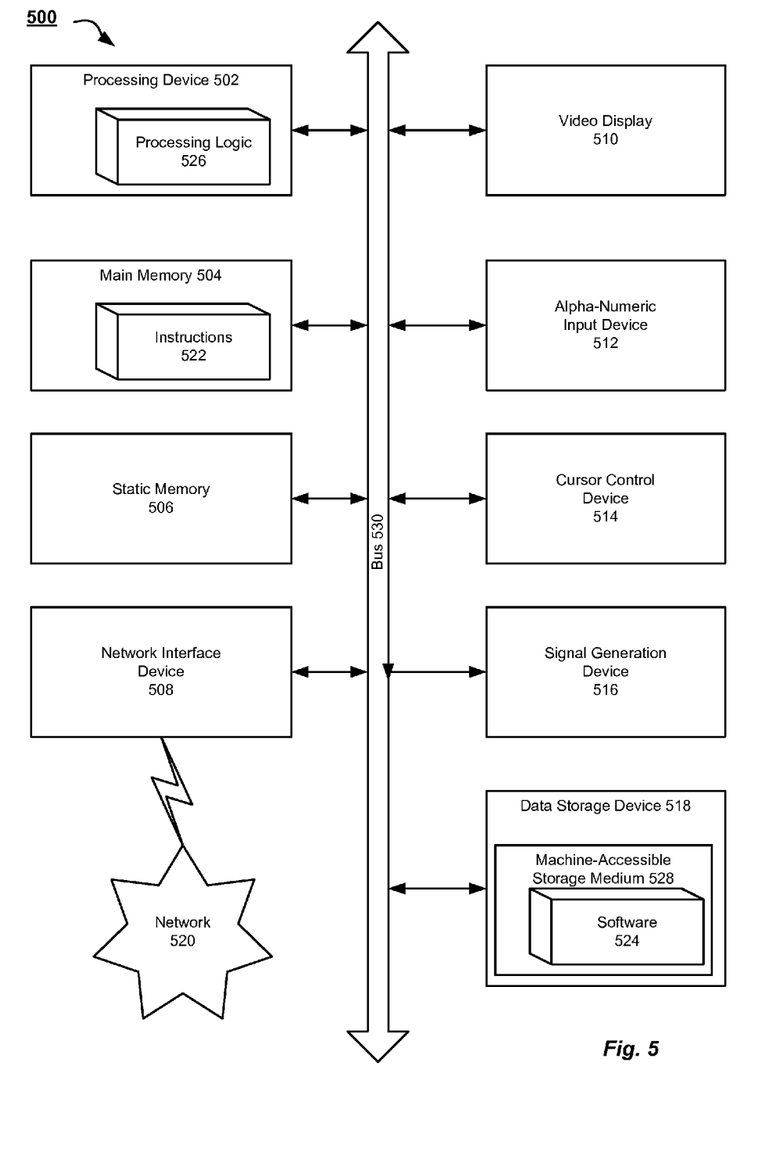
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored software 524 embodying any one or more of the methodologies of functions described herein. The software 524 may also reside, completely or at least partially, within the main memory 504 and/or within the processing device 502 during execution thereof by the computer system 500; the main memory 504 and the processing device 502 also constituting machine-accessible storage media.

The machine-readable storage medium 528 may also be used to store instructions to perform client/node interaction orchestration, such as the processing described with reference to FIG. 4 and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
   receiving, by a processing device, a command from an authenticated owner of an application at a first resource pool, the first resource pool hosted on a first virtual machine (VM) of a platform as a service (PaaS) system and comprising a first application component of the application, wherein the first VM hosts a plurality of resource pools each comprising application components belonging to different application owners, wherein the first application component comprises a first functionality of the application executable using the first resource pool;
   identifying, by the processing device, a second resource pool associated with the application, the second resource pool hosted on a second VM and comprising a second application component of the application, wherein the second VM hosts a plurality of resource pools each comprising application components belonging to different application owners, wherein the second application component comprises a second functionality of the application executable using the second resource pool;
   accessing a command implementation sequence defining the implementation of the received command over multiple application components; and
   executing the command implementation sequence by causing a first action to be executed on the first application component on the first VM and causing a second action to be executed on the second application component on the second VM.

2. The method of claim 1, wherein identifying the second resource pool associated with the application comprises querying a plurality of VMs to find a set of VMs that host a component of the application.

3. The method of claim 2, wherein querying the plurality of VMs is performed by a broker of the PaaS system.

4. The method of claim 1, further comprising identifying a role of the second application component in the application.

5. The method of claim 4, wherein causing the second action to be executed on the second application component on the second VM is in view of the role of the second application.

6. The method of claim 1, further comprising identifying a software cartridge in the second resource pool.

7. The method of claim 6, wherein causing the second action to be executed on the second application component on the second VM is in view of the identified software cartridge.

8. A system comprising:
   a processing device; and
   a memory coupled to the processing device, the processing device to:
     receive a command from an authenticated owner of an application at a first resource pool, the first resource pool hosted on a first virtual machine (VM) of a platform as a service (PaaS) system and comprising a first application component of the application, wherein the first VM hosts a plurality of resource pools each comprising application components belonging to different application owners, wherein the first application component comprises a first functionality of the application executable using the first resource pool;
     identify a second resource pool associated with the application, the second resource pool hosted on a second VM and comprising a second application component of the application, wherein the second VM hosts a plurality of resource pools each comprising application components belonging to different application owners, wherein the second application component comprises a second functionality of the application executable using the second resource pool;
     access a command implementation sequence defining the implementation of the received command over multiple application components; and
     execute the command implementation sequence by causing a first action to be executed on the first application component on the first VM and causing a second action to be executed on the second application component on the second VM.

9. The system of claim 8, wherein identifying the second resource pool associated with the application comprises querying a plurality of VMs to find a set of VMs that host a component of the application.

10. The system of claim 8, wherein the processing device is further to identify a role of the second application component in the application.

11. The system of claim 10, wherein causing the second action to be executed on the second application component on the second VM is in view of the role of the second application.

12. The system of claim 8, wherein the processing device is further to identify a software cartridge in the second resource pool.

13. The system of claim 12, wherein causing the second action to be executed on the second application component on the second VM is in view of the identified software cartridge.

14. A non-transitory machine-readable storage medium comprising instructions that, when accessed by a processing device, cause the processing device to:
receive, by the processing device, a command from an authenticated owner of an application at a first resource pool, the first resource pool hosted on a first virtual machine (VM) of a platform as a service (PaaS) system and comprising a first application component of the application, wherein the first VM hosts a plurality of resource pools each comprising application components belonging to different application owners, wherein the first application component comprises a first functionality of the application executable using the first resource pool;
identify, by the processing device, a second resource pool associated with the application, the second resource pool hosted on a second VM and comprising a second application component of the application, wherein the second VM hosts a plurality of resource pools each comprising application components belonging to different application owners, wherein the second application component comprises a second functionality of the application executable using the second resource pool;
access a command implementation sequence defining the implementation of the received command over multiple application components; and
execute the command implementation sequence by causing a first action to be executed on the first application component on the first VM and causing a second action to be executed on the second application component on the second VM.

15. The non-transitory machine-readable storage medium of claim 14, wherein the processing device to identify the second resource pool associated with the application further comprises the processing device to query a plurality of VMs to find a set of VMs that host a component of the application.

16. The non-transitory machine-readable storage medium of claim 15, wherein the processing device to query the plurality of VMs is performed by a broker of the PaaS system.

17. The non-transitory machine-readable storage medium of claim 14, wherein the processing device further is to identify a role of the second application component in the application.

18. The non-transitory machine-readable storage medium of claim 17, wherein causing the second action to be executed on the second application component on the second VM is in view of the role of the second application.

19. The non-transitory machine-readable storage medium of claim 14, wherein the processing device is further to identify a software cartridge in the second resource pool.

20. The non-transitory machine-readable storage medium of claim 19, wherein causing the second action to be executed on the second application component on the second VM is in view of the identified software cartridge.

* * * * *